United States Patent
Cankaya

(10) Patent No.: US 7,257,127 B1
(45) Date of Patent: Aug. 14, 2007

(54) METHOD AND APPARATUS FOR BURST SCHEDULING

(75) Inventor: Hakki C Cankaya, Dallas, TX (US)

(73) Assignee: Alcatel Lucent, Paris (FR)

(*) Notice: Subject to any disclaimer, the term of this patent is extended or adjusted under 35 U.S.C. 154(b) by 1046 days.

(21) Appl. No.: 10/177,201

(22) Filed: Jun. 21, 2002

(51) Int. Cl.
*H04L 12/43* (2006.01)

(52) U.S. Cl. .................................. 370/459; 370/438

(58) Field of Classification Search ............... 370/438, 370/458, 459
See application file for complete search history.

(56) References Cited

U.S. PATENT DOCUMENTS

| | | | |
|---|---|---|---|
| 6,470,347 B1* | 10/2002 | Gillam | 707/101 |
| 6,661,789 B1* | 12/2003 | Cankaya et al. | 370/390 |
| 6,671,256 B1* | 12/2003 | Xiong et al. | 370/230 |
| 6,721,315 B1* | 4/2004 | Xiong et al. | 370/389 |
| 2002/0118706 A1* | 8/2002 | Narayana | 370/508 |

OTHER PUBLICATIONS

U.S. Appl. No. 09/409,573, filed Sep. 30, 1999, Control Architecture In Optical Burst-Switched Networks.
U.S. Appl. No. 09/497254, filed Feb. 3, 2000, Data Channel Reservation In Optical Burst-Switched Networks.
U.S. Appl. No. 09/393,636, filed Sep. 9, 1999, Dynamic Burstification Based On Fully/Partially Shared Multicast Entities.
U.S. Appl. No. 10/176,740, filed Jun. 21, 2002, Burst Header Packet Encapsulation and Framing.
"Terabit Burst Switching", Jonathan S. Turner, Journal of High Speed Networks, vol. 8, n. 1, 1999, pp. 1-36.

* cited by examiner

*Primary Examiner*—Hassan Kizou
*Assistant Examiner*—Bo Hui Zhu
(74) *Attorney, Agent, or Firm*—Anderson, Levine & Lintel; Jessica W. Smith

(57) ABSTRACT

Control information associated with data bursts to be switched on a burst-switched router is transmitted using payload envelopes (100) on one or more control channels (16). A control channel scheduling module (86) defines sets of contiguous payload envelopes, referred to as "frontiers" (110). A frontier contains a predetermined number of payload envelopes that could be transmitted over a maximum time difference from the time of arrival of a control packet to a latest time of departure for the control packet. After selecting a control packet, a current frontier is determined from a current time and a frontier index. Scheduling information for the current and next frontiers is stored in memory (116). The memory is searched for an available gap to accommodate the control packet (144) in one of either the current set or a next frontier based on the scheduling information.

16 Claims, 8 Drawing Sheets

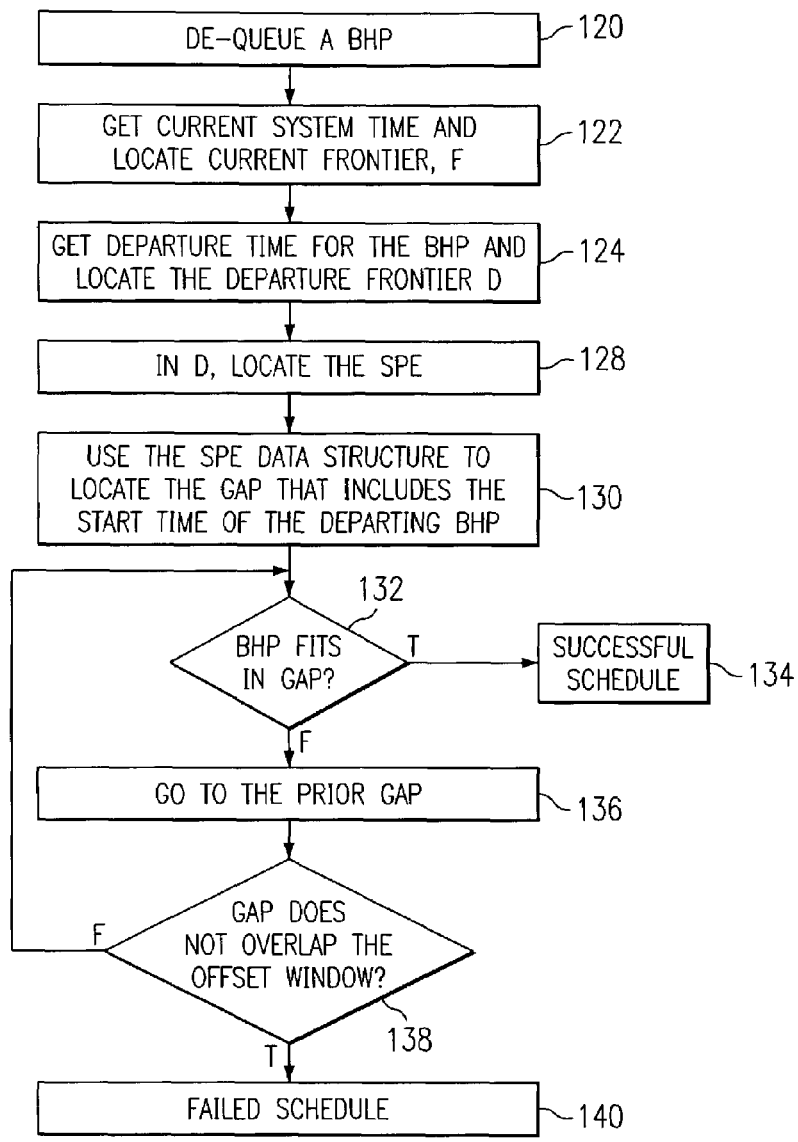
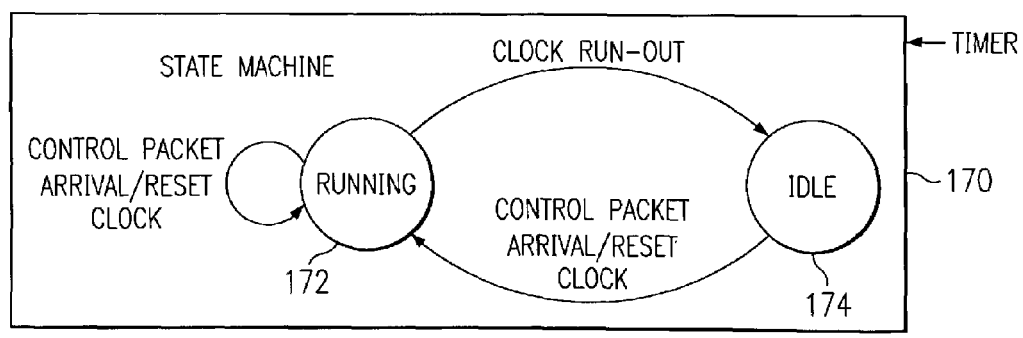

FIG. 12
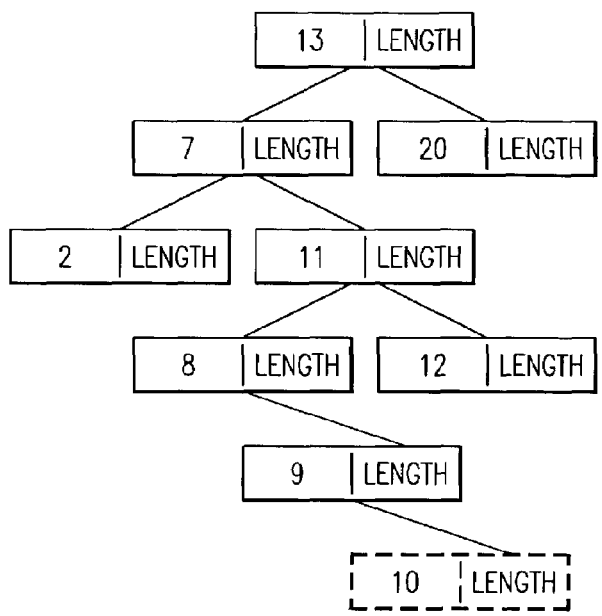
FIG. 13
FIG. 14
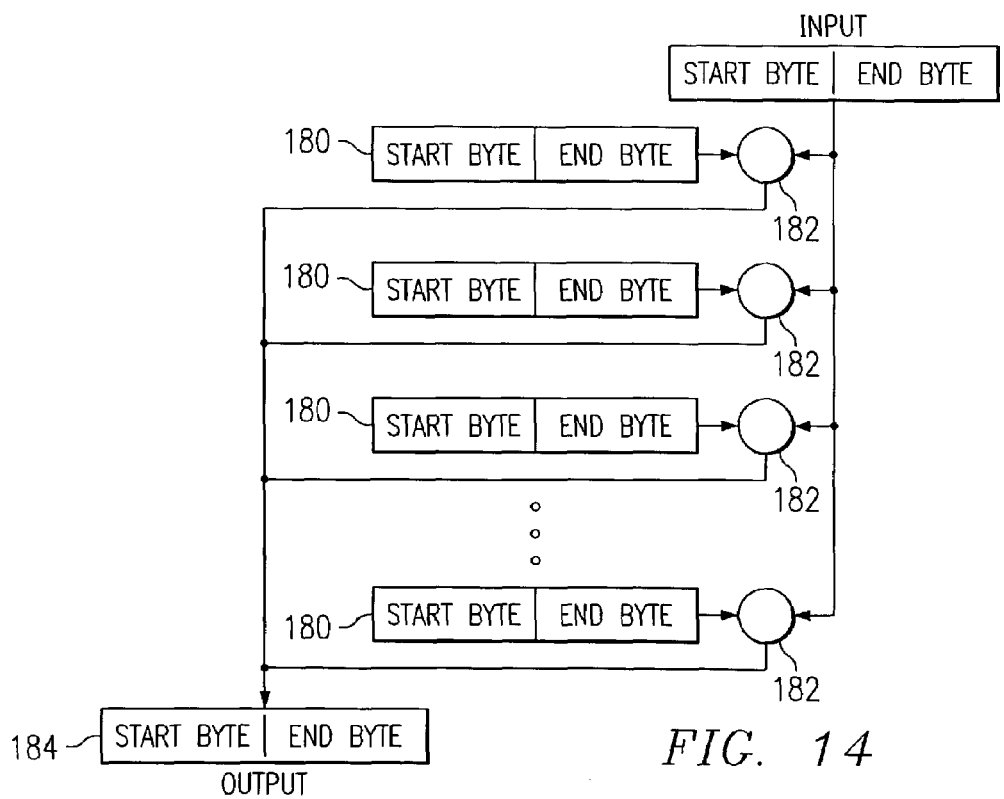

METHOD AND APPARATUS FOR BURST SCHEDULING

CROSS-REFERENCE TO RELATED APPLICATIONS

Not Applicable

STATEMENT OF FEDERALLY SPONSORED RESEARCH OR DEVELOPMENT

Not Applicable

BACKGROUND OF THE INVENTION

1. Technical Field

This invention relates in general to telecommunications and, more particularly, to burst-switched optical networks.

2. Description of the Related Art

Data traffic over networks, particularly the Internet, has increased dramatically recently, and will continue as the user increase and new services requiring more bandwidth are introduced. The increase in Internet traffic requires a network with high capacity routers capable of routing data packets of variable length. One option is the use of optical networks.

The emergence of dense-wavelength division multiplexing (DWDM) technology has improved the bandwidth problem by increasing the capacity of an optical fiber. However, the increased capacity creates a serious mismatch with current electronic switching technologies that are capable of switching data rates up to a few gigabits per second, as opposed to the multiple terabit per second capability of DWDM. While emerging ATM switches and IP routers can be used to switch data using the individual channels within a fiber, typically at 2.4 gigabits per second or ten gigabits per second, this approach implies that tens or hundreds of switch interfaces must be used to terminate a single DWDM fiber with a large number of channels. This could lead to a significant loss of statistical multiplexing efficiency when the parallel channels are used simply as a collection of independent links, rather than as a shared resource.

Different approaches advocating the use of optical technology in place of electronics in switching systems have been proposed; however, the limitations of optical component technology has largely limited optical switching to facility management/control applications. One approach, called optical burst-switched networking, attempts to make the best use of optical and electronic switching technologies. The electronics provides dynamic control of system resources by assigning individual user data bursts to channels of a DWDM fiber, while optical technology is used to switch the user data channels entirely in the optical domain.

Previous optical burst-switched networks designed to directly handle end-to-end user data channels have been disappointing and have shown the limitations of current optical components. Optical burst-switched networks are extremely time-constrained; in a limited time, both the data burst (DB) and the associated control information (the burst header packet or "BHP") must be scheduled for transmission on an outgoing optical link with available room. Scheduling of the BHPs has been found to be extremely challenging.

Therefore, a need has arisen for a method and apparatus for efficiently scheduling burst header packets in a burst-switched network.

BRIEF SUMMARY OF THE INVENTION

Control information associated with data bursts to be switched on a burst-switched router is transmitted using payload envelopes over one or more control channels. Sets of contiguous payload envelopes are defined according to a predetermined number of payload envelopes that could be transmitted during a maximum time difference from the time of arrival of a control packet to a latest time of departure for the control packet. After selecting a control packet, a current frontier is determined from a current time and a frontier index. Scheduling information is searched for an available gap to accommodate the control packet in one of either the current set or a next set.

The present invention provides significant advantages over the prior art. First, it allows control packets to be scheduled efficiently and quickly. Second, the use of predetermined set of payload envelopes minimizes the amount of scheduling information that needs to be stored. Third, a synchronous payload envelope may be used to transport the information.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which:

FIG. 8 illustrates a flow chart describing operation of the control channel scheduling module;

FIG. 11 illustrates a state machine used in determine a current frontier;

FIG. 12 illustrates a linked-list structure of the scheduling calendar of an SPE;

FIG. 13 illustrates a binary tree structure of the scheduling calendar of an SPE; and FIG. 14 illustrates a content addressable memory structure of the scheduling calendar of an SPE.

DETAILED DESCRIPTION OF THE INVENTION

The present invention is best understood in relation to FIGS. 1-14 of the drawings, like numerals being used for like elements of the various drawings.

Figure 1A:
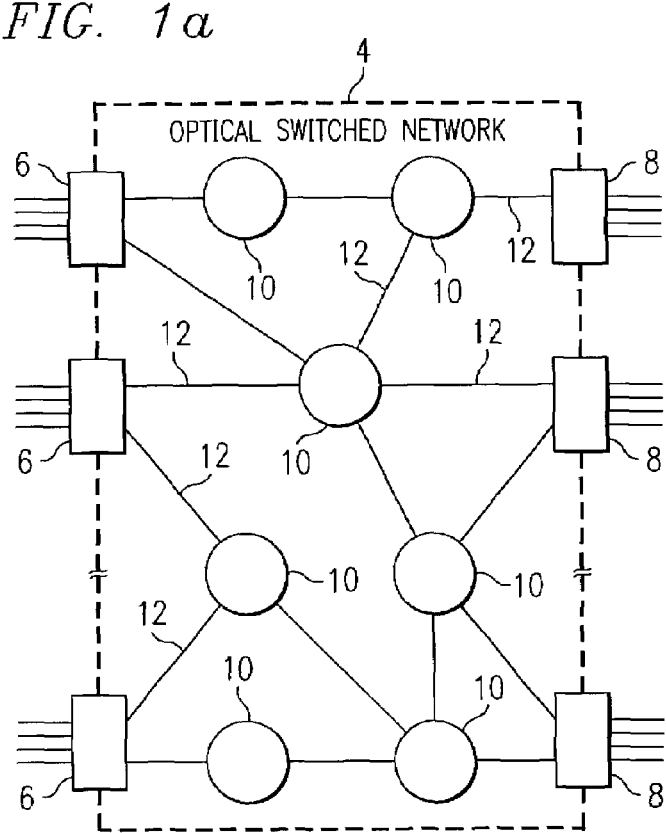
FIG. 1a is a block diagram of an optical network.

FIG. 1a illustrates a general block diagram of an optical burst switched network 4. The optical burst switched (OBS) network 4 includes multiple electronic ingress edge routers 6 and multiple egress edge routers 8. The ingress edge routers 6 and egress edge routers 8 are coupled to multiple core optical routers 10. The connections between ingress edge routers 6, egress edge routers 8 and core routers 10 are made using optical links 12. Each optical fiber can carry multiple channels of optical data.

In operation, a data burst (or simply "burst") of optical data is the basic data block to be transferred through the network 4. Ingress edge routers 6 and egress edge routers 8 are responsible for burst assembly and disassembly functions, and serve as legacy interfaces between the optical burst switched network 4 and conventional electronic routers.

Within the optical burst switched network 4, the basic data block to be transferred is a burst, which is a collection of packets having some common attributes. A burst consists of a burst payload (called "data burst") and a burst header (called "burst header packet" or BHP). An intrinsic feature of the optical burst switched network is that a data burst and its BHP are transmitted on different channels and switched in optical and electronic domains, respectively, at each network node. The BHP is sent ahead of its associated data burst with an offset time $t_{offset}$ ($\geq 0$). Its initial value, $t_{offset0}$ is set by the (electronic) ingress edge router 6.

In this invention, a "channel" is defined as a certain unidirectional transmission capacity (in bits per second) between two adjacent routers. A channel may consist of one wavelength or a portion of a wavelength (e.g., when time-division multiplexing is used). Channels carrying data bursts are called "data channels", and channels carrying BHPs and other control packets are called "control channels". A "channel group" is a set of channels with a common type and node adjacency. A link is defined as a total transmission capacity between two routers, which usually consists of a "data channel group" (DCG) and a "control channel group" (CCG) in each direction.

Figure 1B:
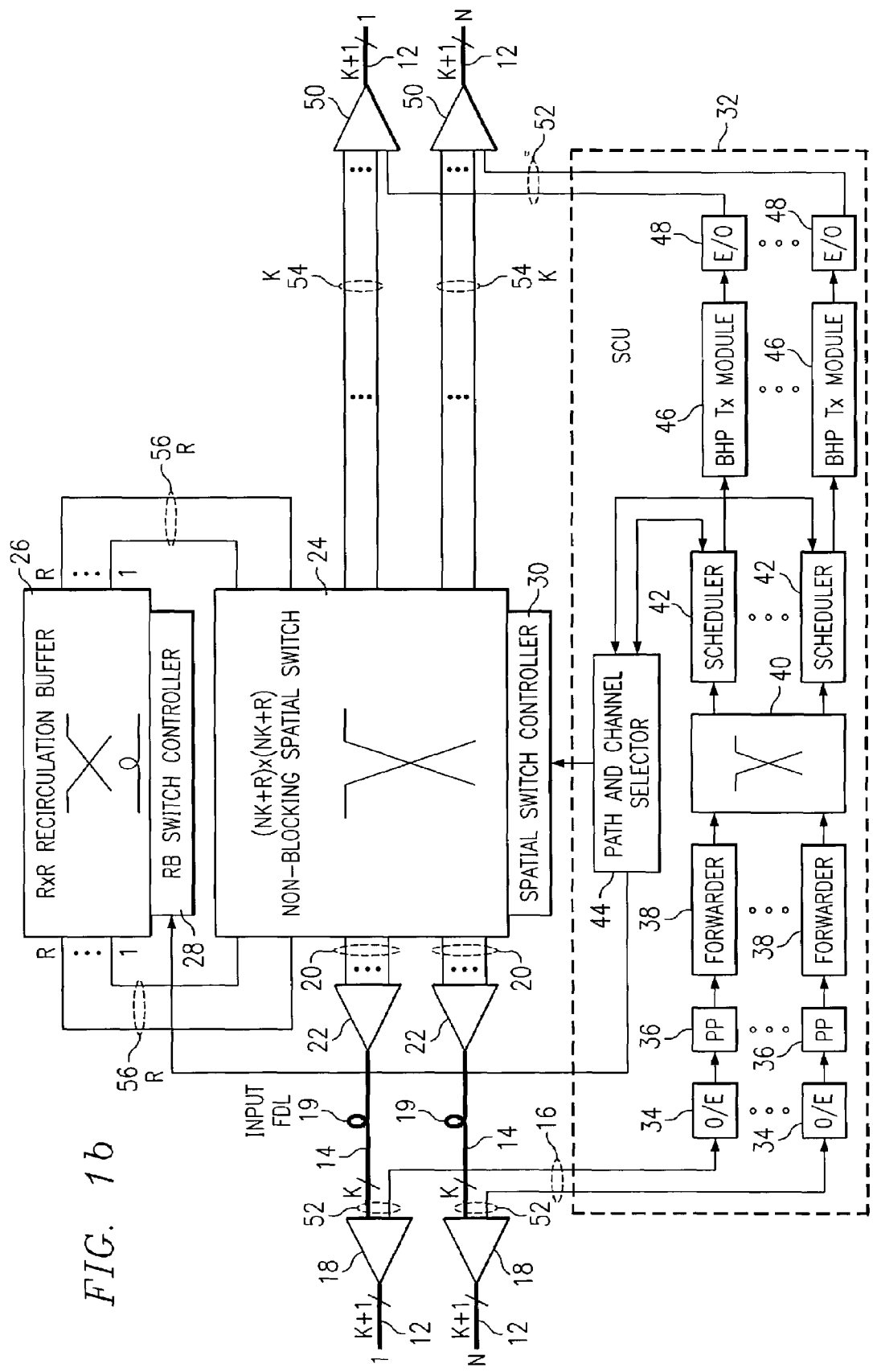
FIG. 1b is a block diagram of a core optical router.

FIG. 1b illustrates a block diagram of a core optical router 10. The incoming DCG 14 is separated from the CCG 16 for each fiber 12 by demultiplexer 18. Each DCG 14 is delayed by a fiber delay line (FDL) 19. The delayed DCG is separated into channels 20 by demultiplexer 22. Each channel 20 is input to a respective input node on a non-blocking spatial switch 24. Additional input and output nodes of spatial switch 24 are coupled to a recirculation buffer (RB) 26. Recirculation buffer 26 is controlled by a recirculation switch controller 28. Spatial switch 24 is controlled by a spatial switch controller 30.

CCGs 14 are coupled to a switch control unit (SCU) 32. SCU includes an optical/electronic transceiver 34 for each CCG 16. The optical/electronic transceiver 34 receives the optical CCG control information and converts the optical information into electronic signals. The electronic CCG information is received by a packet processor 36, which passes information to a forwarder 38. The forwarder for each CCG is coupled to a switch 40. The output nodes of switch 40 are coupled to respective schedulers 42. Schedulers 42 are coupled to a Path & Channel Selector 44 and to respective BHP transmit modules 46. The BHP transmit modules 46 are coupled to electronic/optical transceivers 48. The electronic/optical transceivers produce the output CCG 52 to be combined with the respective output DCG 54 information by multiplexer 50. Path & channel selector 44 is also coupled to RB switch controller 28 and spatial switch controller 30.

The embodiment shown in FIG. 1b has N input DCG-CCG pairs and N output DCG-CCG pairs 52, where each DCG has K channels and each CCG has only one channel (k=1). A DCG-CCG pair 52 is carried in one fiber. In general, the optical router could be asymmetric, the number of channels k of a CCG 16 could be larger than one, and a DCG-CCG pair 52 could be carried in more than one fiber 12. In the illustrated embodiment, there is one buffer channel group (BCG) 56 with R buffer channels. In general, there could be more than one BCG 56. The optical switching matrix (OSM) consists of a (NK+R)×(NK+R) spatial switch and a R×R switch with WDM (wavelength division multiplexing) FDL buffer serving as recirculation buffer (RB) 26 to resolve data burst contentions on outgoing data channels. The spatial switch is a strictly non-blocking switch, meaning that an arriving data burst on an incoming data channel can be switched to any idle outgoing data channel. The delay $t_{fdl}$ introduced by the input FDL 19 should be sufficiently long such that the SCU 32 has enough time to process a BHP before its associated data burst enters the spatial switch.

The R×R RB switch is a broadcast-and-select type switch of the type described in P. Gambini, et al., "Transparent Optical Packet Switching Network Architecture and Demonstrators in the KEOPS Project", *IEEE J. Selected Areas in Communications*, vol. 16, no. 7, pp. 1245-1259, September 1998. It is assumed that the R×R RB switch has B FDLs with the ith FDL introducing $Q_i$ delay time, $1 \leq i \leq B$. It is further assumed without loss of generality that $Q_1 < Q_2 < \ldots < Q_B$ and $Q_0 = 0$, meaning no FDL buffer is used. Note that the FDL buffer is shared by all N input DCGs and each FDL contains R channels. A data burst entering the RB switch on any incoming channel can be delayed by one of B delay times provided. The recirculation buffer in FIG. 1b can be degenerated, to passive FDL loops by removing the function of RB switch, wherein different buffer channels may have different delays.

The SCU is partially based on an electronic router. In FIG. 1b, the SCU 32 has N input control channels and N output control channels. The SCU mainly consists of packet processors (PPs) 36, forwarders 38, a switching fabric 40, schedulers 42, BHP transmission modules 46, a path & channel selector 44, a spatial switch controller 30, and a RB switch controller 28. The packet processor 36, the forwarders 38, and the switching fabric 40 can be found in electronic routers. The other components, especially the scheduler, are new to optical routers. The design of the SCU 32 uses the distributed control as much as possible, except the control to the access of shared FDL buffer which is centralized.

The packet processor performs layer 1 and layer 2 decapsulation functions and attaches a time-stamp to each arriving BHP, which records the arrival time of the associated data burst to the OSM. The time-stamp is the sum of the BHP arrival time, the burst offset-time $t_{offset}$ carried by the BHP and the delay $t_{fdl}$ introduced by input FDL 19. The forwarder mainly performs the forwarding table lookup to decide which outgoing CCG 52 to forward the BHP. The associated data burst will be switched to the corresponding DCG 54. The forwarding can be done in a connectionless or connection-oriented manner.

There is one scheduler for each DCG-CCG pair 52. The scheduler 42 schedules the switching of the data burst on a data channel of the outgoing DCG 54 based on the information carried by the BHP. If a free data channel is found, the scheduler 42 will then schedule the transmission of the BHP on the outgoing control channel, trying to "resynchronize" the BHP and its associated data burst by keeping the offset time $t_{offset}$ as close as possible to $t_{offset0}$. After both the data burst and BHP are successfully scheduled, the scheduler 42 will send the configuration information to the spatial switch controller 30 if it is not necessary to provide a delay through the recirculation buffer 26, otherwise it will also send the configuration information to the RB switch controller 28.

Figure 2:
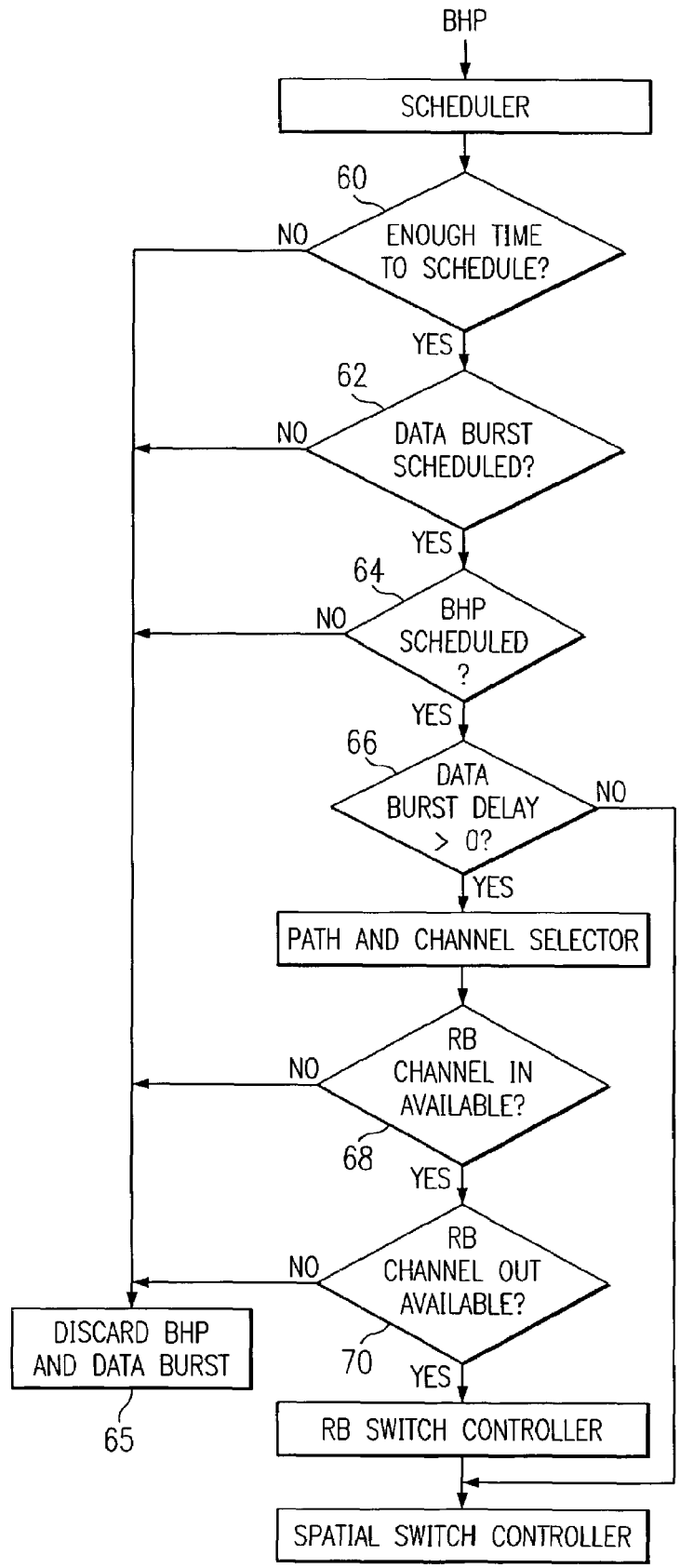
FIG. 2 illustrates a data flow of the scheduling process.

The data flow of scheduling decision process is shown in FIG. 2. In decision block 60, the scheduler 42 determines whether or not there is enough time to schedule an incoming data burst. If so, the scheduler determines whether the data burst can be scheduled, i.e., whether there is an unoccupied space in the specified output DCG 54 for the data burst. In order to schedule the data burst, there must be an available space to accommodate the data burst in the specified output DCG. This space may start within a time window beginning at the point of arrival of the data burst at the spatial switch 24 extending to the maximum delay which can be provided by the recirculation buffer 26. If the data burst can be scheduled, then the scheduler 42 must determine whether there is a space available in the output CCG 52 for the BHP in decision block 64.

If any of the decisions in decision blocks 60, 62 or 64 are negative, the data burst and BHP are dropped in block 65. If all of the decisions in decision blocks 60, 62 and 64 are positive, the scheduler sends the scheduling information to the path and channel selector 44. The configuration information from scheduler to path & channel selector includes incoming DCG identifier, incoming data channel identifier, outgoing DCG identifier, outgoing data channel identifier, data burst arrival time to the spatial switch, data burst duration, FDL identifier i ($Q_i$ delay time is requested, $0 \leq i \leq B$).

If the FDL identifier is 0, meaning no FDL buffer is required, the path & channel selector 44 will simply forward the configuration information to the spatial switch controller 30. Otherwise, the path & channel selector 44 searches for an idle incoming buffer channel to the RB switch 26 in decision block 68. If found, the path and channel selector 44 searches for an idle outgoing buffer channel from the RB switch 26 to carry the data burst reentering the spatial switch after the specified delay inside the RB switch 26 in decision block 70. It is assumed that once the data burst enters the RB switch, it can be delayed for any discrete time from the set $\{Q_1, Q_2, \ldots Q_B\}$. If this is not the case, the path & channel selector 44 will have to take the RB switch architecture into account. If both idle channels to and from the RB switch 26 are found, the path & channel selector 44 will send configuration information to the spatial switch controller 30 and the RB switch controller 28 and send an ACK (acknowledgement) back to the 42 scheduler. Otherwise, it will send a NACK (negative acknowledgement) back to the scheduler 42 and the BHP and data burst will be discarded in block 65.

Configuration information from the path & channel selector 44 to the spatial switch controller 30 includes incoming DCG identifier, incoming data channel identifier, outgoing DCG identifier, outgoing data channel identifier, data burst arrival time to the spatial switch, data burst duration, FDL identifier i ($Q_1$ delay time is requested, $0 \leq i \leq B$). If i>0, the information also includes the incoming BCG identifier (to the RB switch), incoming buffer channel identifier (to the RB switch), outgoing BCG identifier (from the RB switch), and outgoing buffer channel identifier (from the RB switch).

Configuration information from path & channel selector to RB switch controller includes an incoming BCG identifier (to the RB switch), incoming buffer channel identifier (to the RB switch), outgoing BCG identifier (from the RB switch), outgoing buffer channel identifier (from the RB switch), data burst arrival time to the RB switch, data burst duration, FDL identifier i ($Q_1$ delay time is requested, $1 \leq i \leq B$).

The spatial switch controller 30 and the RB switch controller 28 will perform the mapping from the configuration information received to physical components that involved in setting up the internal path(s), and configure the switches just-in-time to let the data burst fly-through the optical router 10. When the FDL identifier is larger than 0, the spatial switch controller will set up two internal paths in the spatial switch, one from the incoming data channel to the incoming recirculation buffer channel when the data burst arrives to the spatial switch, another from the outgoing buffer channel to the outgoing data channel when the data burst reenters the spatial switch. Upon receiving the ACK from the path & channel selector 44, the scheduler 42 will update the state information of selected data and control channels, and is ready to process a new BHP.

Finally, the BHP transmission module arranges the transmission of BHPs at times specified by the scheduler.

The above is the general description on how the data burst is scheduled in the optical router. Recirculating data bursts through the R×R recirculation buffer switch more than once could be easily extended from the design principles described below if so desired.

Figure 3:
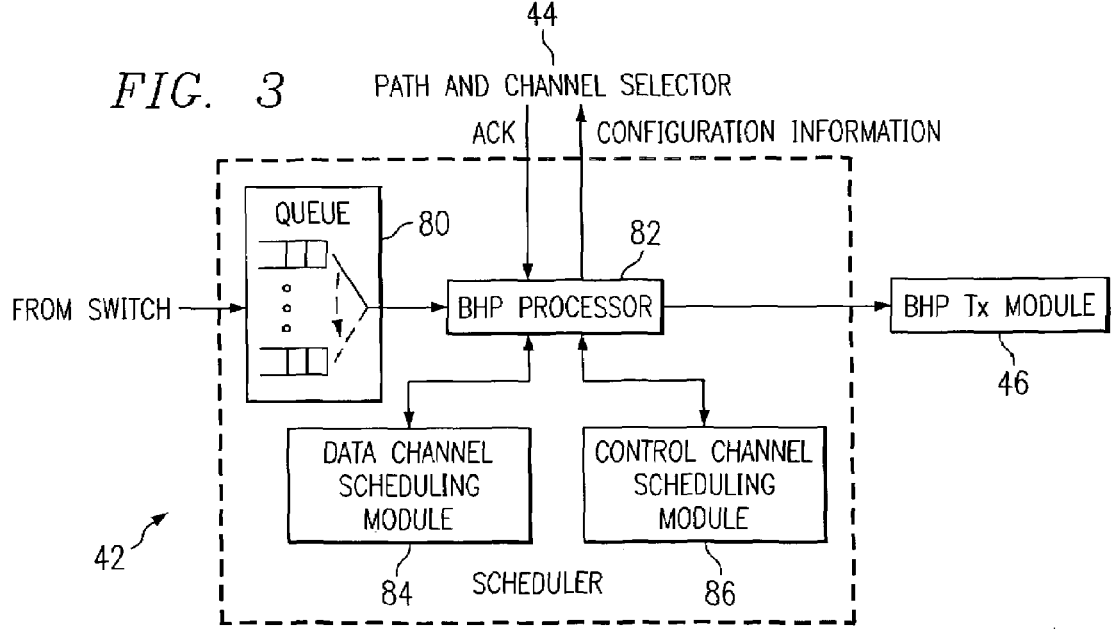
FIG. 3 illustrates a block diagram of a scheduler.

FIG. 3 illustrates a block diagram of a scheduler 42. The scheduler 42 includes a scheduling queue 80, a BHP processor 82, a data channel scheduling (DCS) module 84, and a control channel scheduling (CCS) module 86. Each scheduler needs only to keep track of the busy/idle periods of its associated outgoing DCG 54 and outgoing CCG 52.

BHPs arriving from the electronic switch are first stored in the scheduling queue 80. For basic operations, all that is required is one scheduling queue 80, however, virtual scheduling queues 80 may be maintained for different service classes. Each queue 80 could be served according to the arrival order of BHPs or according to the actual arrival order of their associated data bursts. The BHP processor 82 coordinates the data and control channel scheduling process and sends the configuration to the path & channel selector 44.

The BHP processor 82 first triggers the DCS module 84 for scheduling the data burst (DB) on a data channel in a desired output DCS 54. After determining when the data burst will be sent out, the BHP processor then triggers the CCS module 86 for scheduling the BHP on an associated control channel.

Figure 4:
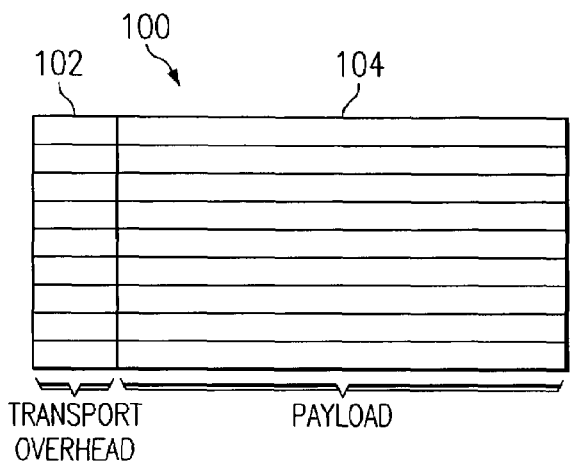
FIG. 4 illustrates a representation of a synchronous payload envelope (SPE)

FIG. 4 illustrates a representation of a synchronous payload envelope (SPE) 100 used to transport the BHP information over a control channel. The SPE 100 can be similar to the STS-1 frame structure used in SONET. The SPE 100 is depicted as a data array, with each row of the array having a transport overhead field 102 and a data field 104. In an STS-1 SPE, each of nine rows has a three byte transport overhead 102 and an eighty-seven byte data field 104. In the present invention, data structures which vary from the STS-1 SPE can be used as appropriate.

Figure 5:
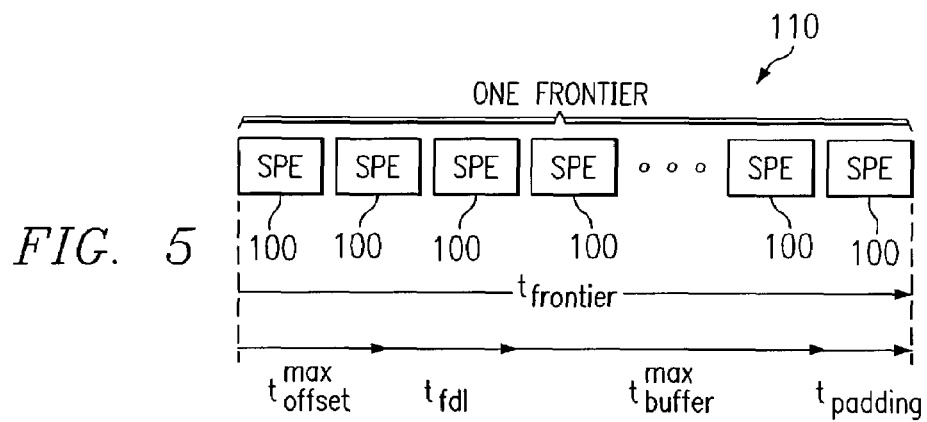
FIG. 5 illustrates a contiguous set of SPEs for storing burst header packets.

FIG. 5 illustrates a set of contiguous SPEs 100 grouped as a "frontier" 110. A frontier represents a set of the maximum number of SPEs that could be transmitted between the arrival of a BHP and its possible departure. The time between the arrival of a BHP and its possible departure is denoted as $t_{frontier}$ and is equal to the sum of $t_{offset}^{max} + t_{fdl} + t_{buffer}^{max} + t_{padding} - t_{min\ proc}$, where $t_{offset}^{max}$ is the maximum allowed offset duration between a BHP and its associated DB, $t_{fdl}$ is the time the DB is delayed in the input FDL 19, $t_{buffer}^{max}$ is the maximum time period that a data burst can be delayed in the recirculation buffer 26, $t_{padding}$ is added time to reach the end of the last full SPE (each frontier has a integer number of SPEs 100) and $t_{min\ proc}$ is the minimum processing time for the BHP. For illustration, $t_{min\ proc}$ is ignored in the calculation.

Figure 6:
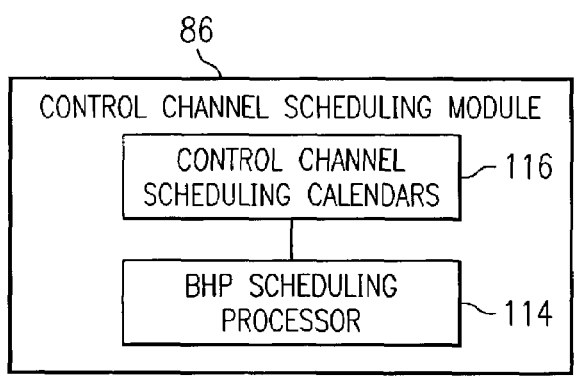
FIG. 6 illustrates a block diagram of a control channel scheduling module.

FIG. 6 illustrates a block diagram of the control channel scheduling module 86, which schedules the transmission of the BHPs in the scheduler 42. The control channel scheduling module 86 includes a scheduling processor 114 and a scheduling calendar memory 116. The scheduling calendar memory 116 stores SPE information. The scheduling processor 114 determines an optimal position for a current BHP within an SPE 100.

It should be noted that control information other than BHPs may be transmitted on the CCG. BHPs and other control information may be referred to herein as control packets.

Figure 7:
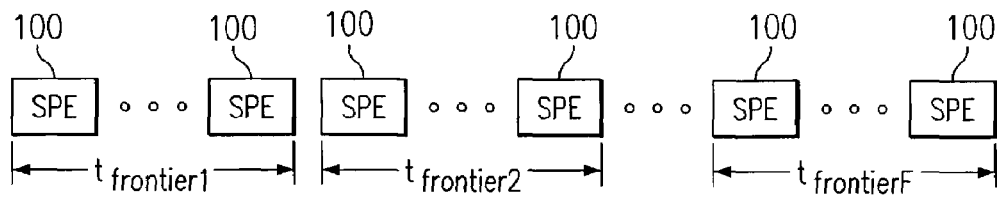
FIG. 7 illustrates a series of frontiers.

Control information is sent in SPEs 100 over a CCG 16. The SPEs are logically divided into frontiers, as shown in FIG. 7. Since the departure time for a BHP could only occur in the current frontier 110 or in the next frontier 110, a scheduling window of only two frontiers 110, frontier(n) and frontier(n+1), is needed in the control channel scheduling calendar memory 116 at any given time. As time progresses, the current and following frontiers are incremented and all the used frontiers and data items in their content are returned to the garbage collection. At initialization, the current frontier is given index "0", the next frontier given index "1" and so on.

FIG. 8 illustrates a flow chart for scheduling a BHP. In block 120, a BHP is retrieved from the queue 80. The control channel scheduling module 86 then retrieves a current time and determines a current frontier in block 122. Determination of the current frontier is discussed in greater detail in connection with FIG. 11. The current frontier is denoted herein as frontier "F".

The departure time for the BHP is determined in block 124. The departure time of the BHP leads the departure time of the associated data burst by a predetermined minimum offset time. Once the departure time is determined, the departure frontier, D, can be determined. The departure frontier D can be the same as the current frontier C, or it can be the next successive frontier.

In block 128, the SPE within departure frontier D that corresponds to the BHP departure time is identified. In block 130, a gap within this SPE is located. Three methods of locating the gap are described in connection with FIGS. 12-14.

Decision block 132 determines whether the current BHP can fit in the gap identified in block 130. If so, the BHP is scheduled for departure within the gap in block 134. In some cases, however, the BHP may not fit in the gap. In these cases, the control channel scheduling module will attempt to fit the BHP in an earlier gap (thereby increasing the time differential between the BHP and its associated burst) in blocks 136 and 138, so long as the gap is within the offset window (i.e., the departure of the BHP does not precede the departure of the associated data burst by more than $t_{offset}^{max}$). For each gap, the test of decision block 132, which ensures that the BHP will fit in the gap, is repeated. If the BHP will not fit in any of the gaps within the offset window, the scheduling of the BHP fails.

Figure 9:
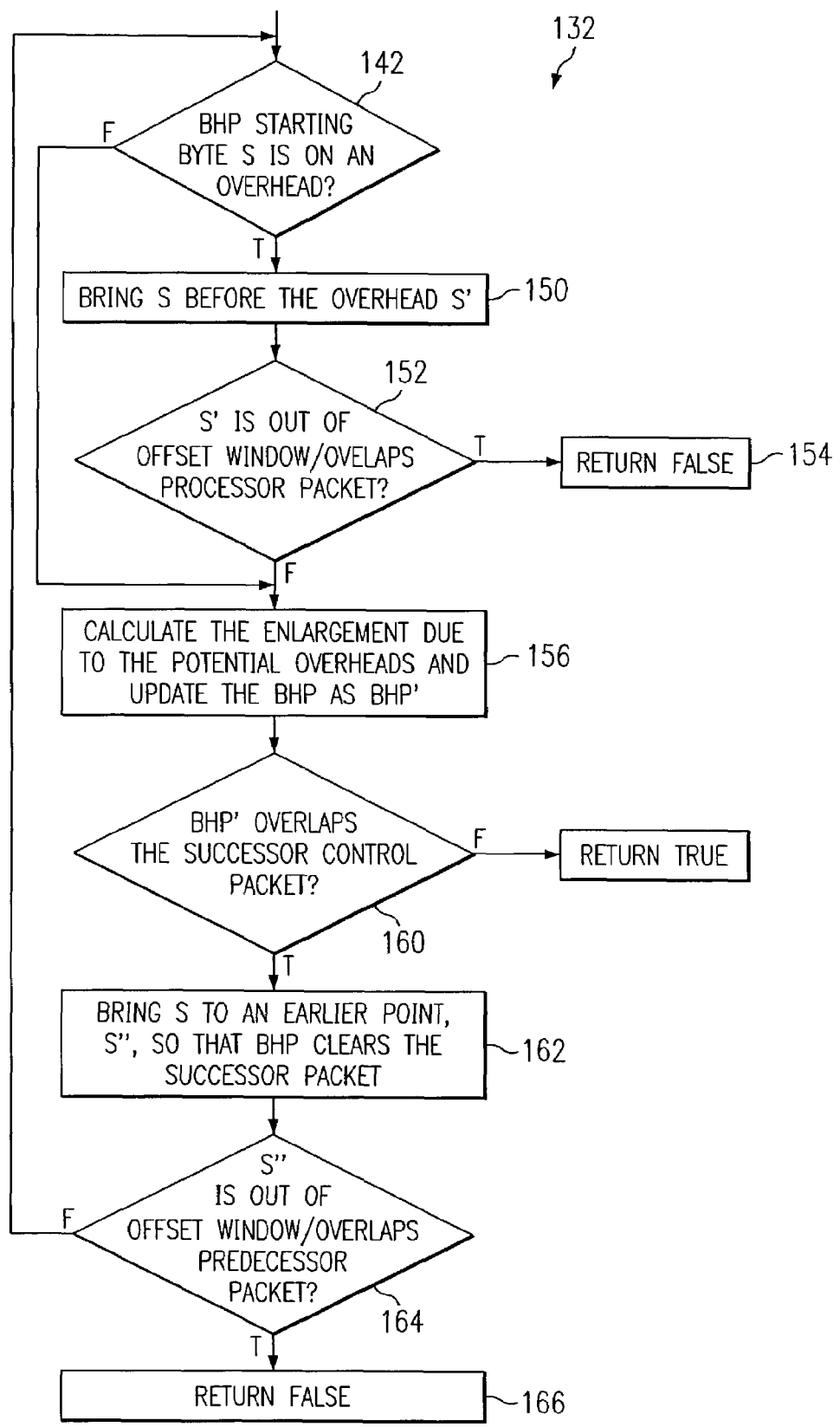
FIG. 9 illustrates a flow chart describing a gap-fitting function of the control channel scheduling module.
Figure 10A:
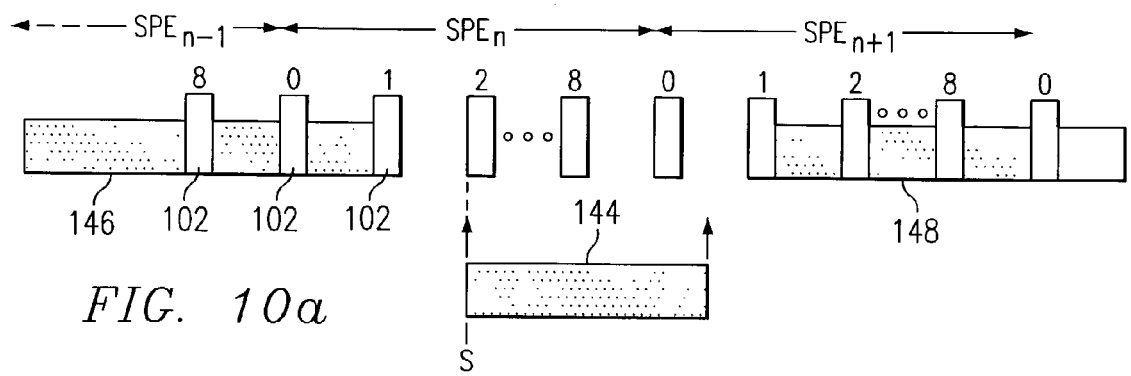
FIGS. 10a through 10d depict an example of the gap-fitting function of FIG. 9.
Figure 10B:
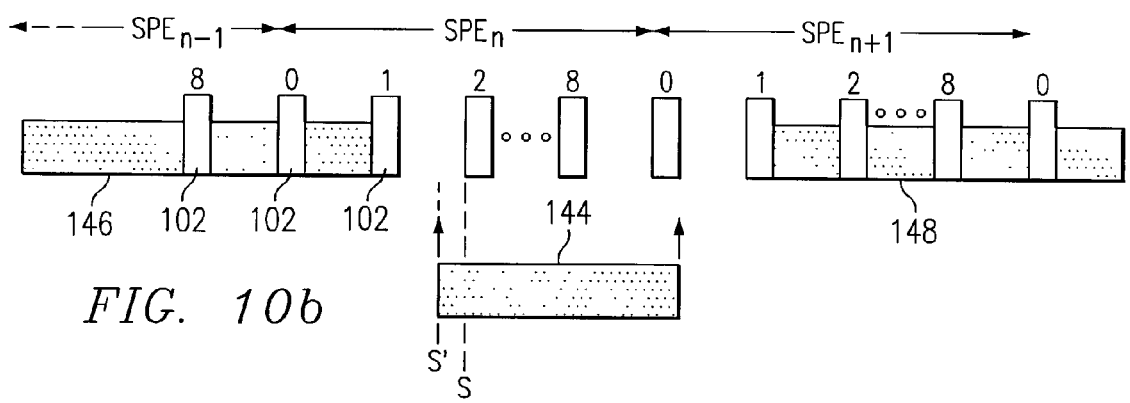
Figure 10C:
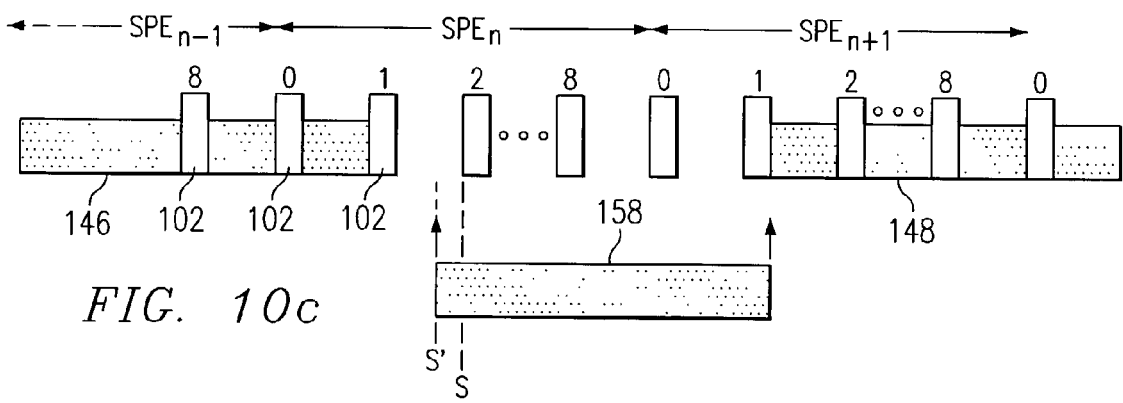
Figure 10D:
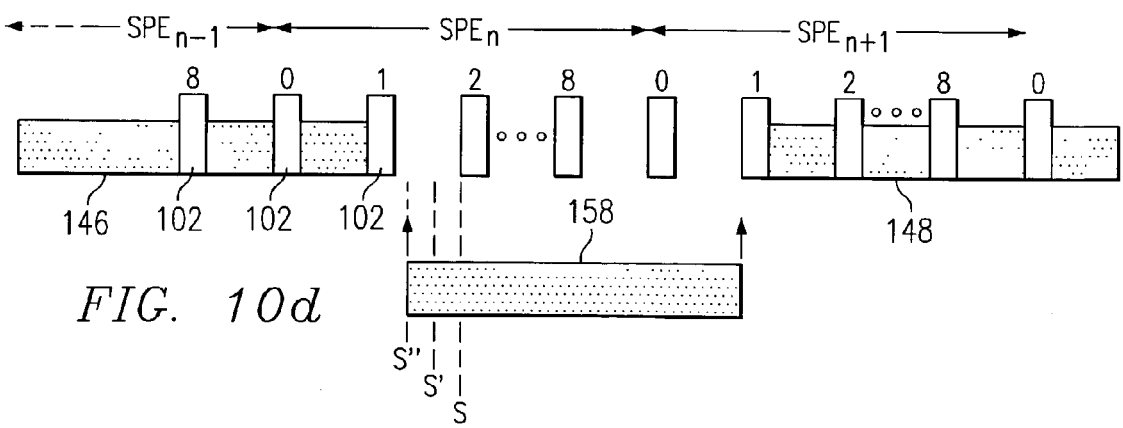

FIG. 9, in conjunction with FIGS. 10a-d, illustrates block 132 in greater detail. Decision block 142 determines whether the BHP to be scheduled starts on an overhead byte in the associated SPE. This circumstance is shown graphically in connection with FIG. 10a. In this figure, BHP 144 is the BHP to be scheduled. The starting point of BHP 144 is denoted "S". This point is after a previously scheduled control packet 146 and before another previously scheduled control packet 148. In FIG. 10a, however, S is on a transport overhead area 102 (see FIG. 4). Accordingly, the start of the BHP 144 is moved to a prior point S' to clear the transport overhead area of the SPE (block 150), as shown in FIG. 10b. If after the shift to S', the BHP is now outside of the offset window or overlaps the predecessor packet 146 in decision block 152, then a "false" is returned in block 154. On the other hand, if S' is not out of the offset window and is not overlapping the predecessor packet 146, then an enlargement is calculated in block 156 to generate BHP' 158, as shown in FIG. 10c.

The enlargement of BHP 144 to BHP' 158 is necessary to take into account the portions of the SPE(s) used for transport overhead 102. As shown in FIG. 10c, the BHP' may again overlap the successor packet 148. If BHP' overlaps the successor control packet 158 in decision block 160, then the starting point is brought an earlier time, S", in order to clear the successor packet (block 162). If after the delay to S", BHP'' 158 is now outside of the offset window or overlaps the predecessor packet 146 in decision block 164, then a "false" is returned in block 166. On the other hand, if S" is not out of the offset window and is not overlapping the predecessor packet 164, then control returns to decision block 142, to determine whether the new starting position lies on an overhead area. The loop will continue until the BHP does not overlap the successor control packet 148 in block 160 (see FIG. 10d), at which time a "true" is returned in block 168.

There may be periods of silence that could cause the control channel scheduling module to lose track of the current position in the scheduling calendar. In the preferred embodiment, a timer is available at the core router receiving end to run a state machine. A state diagram describing the operation of the running/idle state machine 170 is shown in FIG. 11.

The running/idle state machine 170 has two states: running 172 and idle 174. Initially, a clock is set to the value of two times the frontier duration. The clock counts down in the running state until either: (1) a control packet arrives from any of the control channels within the incoming control channel group or (2) the clock runs out, indicating that two frontiers have passed without a control packet. If a control packet arrival occurs while the state machine 170 is in the running state 170, the clock is reset and an "R" code is passed along with the packet to the processing queue. If the clock runs out, then the state machine 170 goes into the idle state 174. In the idle state 174, only the packet arrival can occur. Once a packet arrives, the clock is reset, an "I" code is passed along with the BHP and the state machine returns to the running state 172.

At the control channel scheduling module 86, the scheduling is performed according to a system clock. If the code associated with a BHP is an "R", the system clock is read as the current time. By dividing the current time by frontier value, the least significant bit of the quotient will indicate which of the two frontiers is the current frontier. If the least significant bit is the same as the least significant bit of the previously calculated value, then the current frontier has not changed. If the least significant bit has changed from its previous current value, then the current frontier is updated to point to the next frontier and the previous frontier is returned to the garbage collection. A new frontier is added as the second frontier.

If the packet has an I code, the system clock, current and next frontiers are reset and the scheduling is performed. Using this approach, the system will never experience a clock overflow situation.

Back to the control channel scheduling, the outgoing time is divided by the frontier value and the least significant bit of the quotient's binary equivalent defines the frontier number in which this control packet needs to be scheduled. The reminder of the division defines the reference time within the frontier by which the SPE can be located in order to schedule the control packet.

For scheduling, each SPE has a reservation calendar for documenting previously scheduled control packets by remembering each of their starting byte and length in number of bytes. Three different approaches are described herein for arranging the data structure at the SPE level: (1) linear linked list, (2) binary tree, (3) parallel content addressing. Other approaches may also be used.

FIG. 12 illustrates a linked-list structure for the scheduling calendar of an SPE. In this approach, data related to already-scheduled control packets are arranged in a linear linked list. In this approach, When a new packet is scheduled, a linear search is done on the list. A linear search as the complexity of O(n), where n is the number of items in the linked list.

FIG. 13 illustrates a block diagram of a binary tree approach. As control packets are scheduled, they are positioned in the binary tree according to starting position (byte position in the SPE). In the binary tree illustrated in FIG. 13, control packets were scheduled (in order) at starting positions 13, 7, 11, 2, 20, 8, 12 and 9. Each node in the tree includes the starting position and length of the associated control packet. Each node can have, at most, one parent node and two child entries. If there are two child entries, one must have a lesser starting position and the other must have a greater starting position. New entries are added to the tree by following a path through the tree according to whether the starting position is greater than or less than the starting position at each node. The new entry is added at the first available node.

To schedule a BHP at a given starting position, a search for the prior and successor packets is performed. Hence for a BHP starting at byte "10", there is a search for packets at bytes "9" and "11". The time complexity of this search is O(log n), where n is the number of data items in the tree.

FIG. 14 illustrates a search using a content addressable memory units 180. Each memory unit 180 can be accessed in a parallel manner. Each of the memory units stores the starting bye an the ending byte of each gap in the scheduling map for an SPE. A parallel comparison (depicted by circles 182) is made to locate a gap that can locate the control packet, considering the offset value. Only a successful comparison results in a write to the result register 184. The time complexity for this structure is O(1).

The present invention provides significant advantages over the prior art. First, it allows BHPs and other control packets to be scheduled efficiently and quickly. Second, the use of frontiers minimizes the amount of scheduling information that needs to be stored in the control channel scheduling module. Third, a synchronous payload envelope may be used to transport the information.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the Claims.

The invention claimed is:

1. A method of transmitting control information associated with data bursts on a burst-switched router, where control information is transmitted in payload envelopes over one or more control channels, comprising the steps of:
    defining a plurality of sets of contiguous payload envelopes;
    selecting a control packet;
    from said sets of contiguous payload envelopes, determining a current set in which the control packet can be sent based on a current time and a set index;
    storing in memory scheduling information for the current set and the next set thereafter;
    determining an available gap to accommodate said control packet in one of either the current set or the next set based on said scheduling information; and
    maintaining a scheduling calendar associated with each payload envelope of said current and next sets, indicating positions of previously scheduled control information.

2. The method of claim 1 wherein said sets of contiguous payload envelopes are determined according to a maximum time difference from the time of arrival of a control packet to a latest time of departure for said control packet.

3. The method of claim 1 wherein a payload envelope comprises multiple payload areas separated by multiple overhead areas, and wherein said step of determining an available gap comprises the step of determining a size requirement for the control packet that accounts for said overhead areas.

4. The method of claim 1 wherein said step of determining a current set, comprises the step of dividing a system clock value by the set index to obtain a quotient in binary form and determining whether a least significant bit of the quotient has changed.

5. The method of claim 4 and further comprising the step of resetting the system clock if a predetermined idle time is exceeded.

6. The method of claim 1 wherein said maintaining step comprises the step of providing a linked list of entries for each scheduled control packet.

7. The method of claim 1 wherein said maintaining step comprises the step of providing a binary tree of entries for each scheduled control packet.

8. The method of claim 1 wherein said maintaining step comprises the step of providing a content addressable memory storing entries for each scheduled control packet.

9. A burst-switched router having a plurality of input ports and a plurality of output ports, comprising:
    circuitry for switching data bursts between the input ports and the output ports;
    circuitry for transmitting control information associated with data bursts, where the control information is transmitted in payload envelopes over one or more control channels, said circuitry for transmitting control information including:
        circuitry for defining a plurality of sets of contiguous payload envelopes;
        circuitry for determining a current set in which a selected control packet can be sent based on a current time and a set index;
        circuitry for storing in memory scheduling information for the current set and the next set thereafter;

circuitry for determining an available gap to accommodate said control packet in one of either the current set or the next set based on said scheduling information; and circuitry for maintaining a scheduling calendar associated with each payload envelope of said current and next sets, indicating positions of previously scheduled control information.

10. The router of claim 9 wherein said sets of contiguous payload envelopes are determined according to a maximum time difference from the time of arrival of a control packet to a latest time of departure for said control packet.

11. The router of claim 9 wherein a payload envelope comprises multiple payload areas separated by multiple overhead areas, and wherein said circuitry for determining an available gap comprises circuitry for determining a size requirement for the control packet that accounts for said overhead areas.

12. The router of claim 9 wherein said circuitry for determining a current set comprises circuitry for dividing a system clock value by the set index to obtain a quotient in binary form and determining whether a least significant bit of the quotient has changed.

13. The router of claim 12 and further comprising circuitry for resetting the system clock if a predetermined idle time is exceeded.

14. The router of claim 9 wherein said maintaining circuitry comprises circuitry for providing a linked list of entries for each scheduled control packet.

15. The router of claim 9 wherein said maintaining circuitry comprises circuitry for providing a binary tree of entries for each scheduled control packet.

16. The router of claim 9 wherein said maintaining circuitry comprises circuitry for providing a content addressable memory storing entries for each scheduled control packet.

* * * * *